United States Patent Office 3,046,114

Patented July 24, 1962

3,046,114

DIAZO COMPOUNDS AND PRINTING PLATES MANUFACTURED THEREFROM

Oskar Süs, Wiesbaden-Biebrich, Germany, assignor, by mesne assignments, to Azoplate Corporation, Murray Hill, N.J.

No Drawing. Filed Dec. 9, 1957, Ser. No. 701,293
Claims priority, application Germany Mar. 1, 1955
30 Claims. (Cl. 96—33)

The present invention relates to the photomechanical production of images and printing plates. More particularly, it pertains to a process of making images and especially printing plates using light sensitive material coated with a light sensitive layer of orthoquinone diazides, a special group of diazo compounds.

In U.S. patent application Serial No. 174,556, filed on July 18, 1950, by Maximilian Paul Schmidt and now abandoned, a process has been described for the production of images, in particular of printing plates, by means of diazo compounds, which calls for the following procedure: diazo compounds insoluble in water which are derived from 2-diazo-naphthol-(1)- or 1-diazo-naphthol-(2) and have the chemical constitution of esters or amides of a sulfo-acid or a carboxylic acid of these diazo naphthols are used to produce a light sensitive layer on a base material; this layer is then exposed to actinic light under a master pattern, and the image is developed with alkali and subsequently heated.

In the above cited patent application Serial No. 174,556 it has also been pointed out that it is possible to add resins or fatty acids to the diazo compounds or to apply such resins or fatty acids to the base material as an intermediate layer between the base and the light sensitive layer; the heating, furthermore, can be omitted and the process may also be carried out without the use of resins or fatty acids.

The U.S. patent applications Serial Nos. 202,403, filed December 22, 1950, and 208,055, filed January 26, 1951, both by Maximilian Paul Schmidt; Serial No. 238,369, filed July 24, 1951, by Oskar Süs, and Serial No. 268,148, filed January 24, 1952, by Oskar Süs and Maximilian Paul Schmidt, all now abandoned, describe the use of other groups of diazo compounds that are insoluble in water and belong to the category of orthoquinone diazides.

All the inventions covered by the above mentioned patent applications pertain to positive working processes or to the production of positives from positive master patterns or of negatives from negative master patterns.

The present invention pertains, in addition to positive working processes wherein as stated above alkali is used as developing agent, to negative working processes by means of which negative printing plates can be obtained from positive master patterns and vice-versa, positive printing plates can be obtained from negative master patterns by the use of specific water-insoluble diazo compounds of the category of ortho-quinone diazide carboxylic acid esters, if the light sensitive material described, subsequent to the exposure of the diazo compound layer to actinic light is treated with an acid. In certain cases it may be desirable to use a mixture containing both an acid and an organic solvent. It will be understood that the light sensitive material may be exposed to a projected light image as well as to a light image formed by contact exposure with a master pattern.

The above mentioned orthoquinone-diazide esters are expressly suited for the development with acids (or acid agents) and for the manufacture of positive printing plates from negative masters. This group consists of esters of naphthoquinone-(1,2)-diazide-carboxylic acids and hydroxy naphthoimidazols which are substituted by alkyl in the imidazole nucleus at the nitrogen atom and possibly at the 2-carbon atom. The following formula illustrates this group:

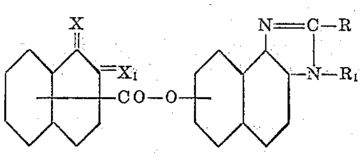

in which X and $X_1$ are $N_2$ or O and are different from each other, and R and $R_1$ are alkyl radicals.

The isomeric form of these compounds, in which $R_1$ is attached to the nitrogen in the 3-position rather than in the 1-position is also included within this invention.

When proceeding in accordance with this invention, the heating operation suggested as the last step of the process described in application Serial No. 174,556 can be omitted in most cases.

This invention is based on the fact that the behaviour of the water insoluble quinone-diazides when treated with one or the other chemical treating agent is different from the behaviour of their light-transformation products in particular with respect to the adhesion to the base material, especially, if metal foils or metal sheets are used as the base support. On exposure to actinic light the quinone-diazides are believed to turn into carboxylic acids of five-membered carbocycles; thus cyclo-pentadiene-carboxylic acids are obtained from the quinone-diazides of the benzene series, and indene-carboxylic acids originate from the quinone-diazides of the naphthalene series (compare O. Süs, "Liebig's Annalen der Chemie," volume 556, page 65 (1944)). In addition to these acids which constitute readily coupling azo components azo dyes can possibly form at the places affected by light due to the coupling of undecomposed quinone-diazides with the carboxylic acids resulting from the action of light.

For removing the diazo compound which remained unchanged under the dense areas of the master in the course of the exposure to light, aqueous solutions of mineral acids such as phosphoric acid, sulfuric acid, hydrochloric acid or nitric acid or of organic acids, such as formic acid, acetic acid, oxalic acid, citric acid and the like, are very well suited. Acid salts such as sodium bisulfate may also be used. The solutions of these acids may be applied to the exposed material by any suitable means, e.g. with the aid of a cotton swab or the exposed material may be bathed or immersed therein. Thickening agents, like dextrin, gum arabic, water-soluble cellulose ethers or similar substances, can be added to the acid solution and the action of the acids may be tempered by the addition of buffer salts. Frequently, the addition of salts like sodium chloride, calcium chloride, ammonia chloride or magnesium sulfate will also prove of advantage. Water-soluble organic solvents, like lower aliphatic alcohols, e.g. methanol, ethanol, propanol, ethylene-chlorohydrine, glycol, glycol-mono-alkyl ethers, diglycol or triglycol, furthermore acetone, tetrahydrofuran, dioxane and the like can also be added to the solution with advantage. The addition of salts frequently proves of advantage also when water miscible organic solvents are used.

When developing agents made up of water and water-miscible organic solvents (which may contain salts dissolved therein) are used, negative images from positive master patterns are also obtained and vice versa. The addition of acids is not absolutely necessary, however, it proves of advantage.

The development can be effected also with water-immiscible organic solvents, like benzene, xylene, etc., or with dispersions of such solvents in water that may contain acids, thickening agents or salts. Mixtures of water-immisible solvents with water-miscible solvents can also be employed. It is possible, furthermore, to use mixtures of several water-immiscible solvents. In this case it does not necessarily prove of disadvantage, the results, on the contrary, being decidedly favorable in some instances, if solvents are added that do not readily dissolve the diazo compounds in question, as is the case with most of the low aliphatic hydrocarbons, e.g. gasoline.

The preparation of the diazo compounds to be used for the production of the light-sensitive layer in accordance with this invention which constitutionally represent esterified carboxylic acids of ortho-naphthoquinone diazides and which are insoluble in water while being soluble in organic solvents, can be performed by known methods. Insofar as the methods of preparation are not already known from the literature, they have been described in detail in the hereto following examples.

For coating the base material, it is possible to use mixtures of two or more light-sensitive o-quinone diazides. In some instances an improvement of the layers can be achieved in this manner. This applies, in particular, to the o-quinone diazides that have a stronger tendency to crystallize. In these instances the use of mixtures of the diazo compounds results in uniform varnish-like layers that prove strongly resistant to abrasion when applied to the base material.

Metallic bases of the kind customarily used in planographic printing, for instance, aluminum or zinc or possibly brass, and furthermore lithographic stones, are primarily suited as base materials. The surfaces of those materials may be pretreated either mechanically by brushing, sandblasting or similar means, or chemically, e.g. by phosphate bath treatment or electrochemically in known and customary manner.

For coating the base material, the diazo compounds to be used according to this invention are dissolved in an organic solvent, e.g. alcohol, dioxane, glycol ether, etc., or in a mixture of several solvents and are applied to the base by brushing, whirlcoating, spraying, immersion, roller application or any other method and are then dried.

For the purpose of facilitating the control of the exposure, dyes can be added to the sensitizing solutions which bleach out under the influence of light or compounds that get colored when exposed to light may be added, e.g. small quantities of diazo-salicylic acid which yields a red dye when exposed to light. The developed image is rendered more visible to the eye if dyes are added to the coating solutions, e.g. a small quantity of eosin (Schultz, "Farbstofftabellen," 7th edition, volume 1, page 375, No. 883). The same effect can be achieved by the use of o-quinone diazides derived from dyes, for example, o-quinone diazides which are also azo dyes; i.e. they have at least one auxochromic group in the part of the molecule connected to the sulfur acid group by esterification or amidation.

The light-sensitive layers obtained with water-insoluble o-quinone diazides in accordance with this invention can be stored for a considerable period of time in unexposed condition, and thus presensitized light-sensitive foils ready for use can be made available by the invention.

The following compounds which are referred to in thef ollowing examples represent ortho quinone diazides which are useful according to the present invention. The parts stated in the examples are parts by weight, if not otherwise indicated.

FORMULA 1

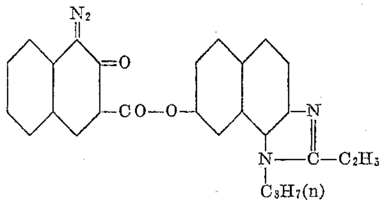

or

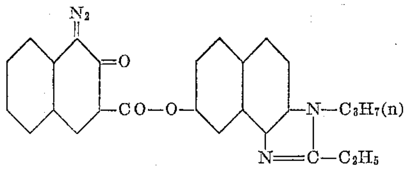

FORMULA 2

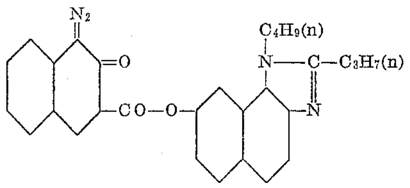

or

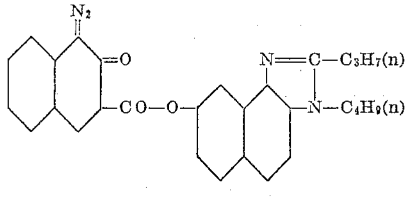

FORMULA 3

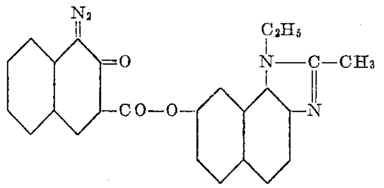

or

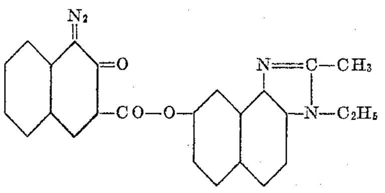

FORMULA 4

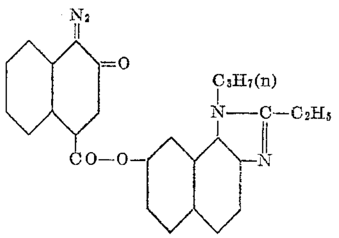

or

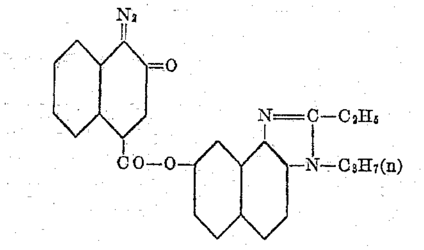

FORMULA 5

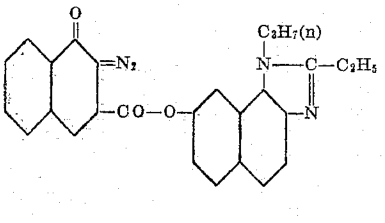

or

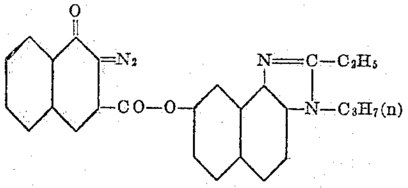

FORMULA 6

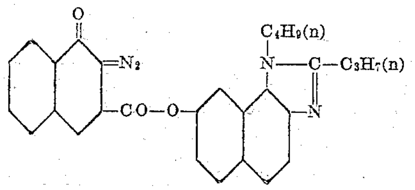

or

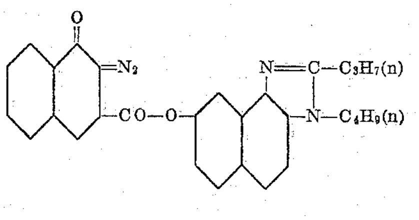

FORMULA 7

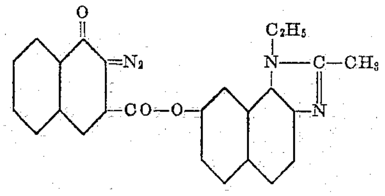

or

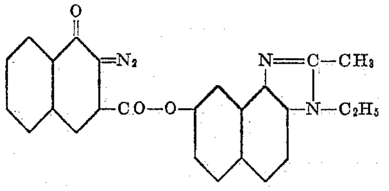

FORMULA 8

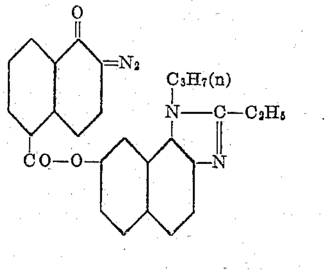

or

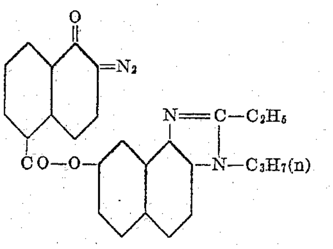

*Example 1*

A 1% solution of the diazo compound corresponding to Formula 1 in glycol monomethyl ether is coated onto a mechanically roughened aluminum foil by means of a plate-whirler. After thoroughly drying the coated layer, the foil is exposed for about 3–4 minutes under a negative transparent original. The exposed layer is subsequently developed with 1% phosphoric acid to yield a positive image, which accepts greasy ink. The foil may now be used as a printing plate.

The diazo compound corresponding to Formula 1 is prepared as follows:

9.3 parts by weight of naphthoquinone-(1,2)-diazide-(1)-3-carboxylic acid chloride are added to a solution of 5.1 parts by weight of 7′-hydroxy-N-(1 or 3)-n-propyl-2-ethyl-1′,2′:4,5-naphthoimidazole in 40 parts by volume of pyridine, and the reaction mixture is agitated for 2 hours at 40–50° C. It is then combined with the same quantity of hydrochloric acid, whereupon the 1-diazo-naphthol-(2)-3-carboxylic acid ester of the Formula 1 precipitates, which is drawn off, washed, and finally dried. It forms yellow crystals which have no definite melting point.

*Example 2*

A 1% solution of the compound corresponding to Formula 2 in ethylene glycol monomethyl ether is coated by means of a plate whirler onto an aluminum foil both sides of which had been mechanically roughened, and the coating is then dried. The dry light sensitive layer is then exposed for 1–2 minutes under a negative transparent original, using as the light source an arc lamp. The exposed layer is developed by means of a 0.5–1% solution of phosphoric acid. Without previously rinsing the developed foil with water the image can be inked with greasy ink and used for printing. A positive printing plate is obtained.

For accelerating the development of the image, solvents, preferably alcohols, e.g. ethyl alcohol, may be added to the phosphoric acid used as a developer.

The diazo compound corresponding to Formula 2 is prepared as follows:

9.3 parts by weight of naphthoquinone-(1,2)-diazide-(1)-carboxylic acid chloride-(3) are added to a solution of 5.7 parts by weight of 7′-hydroxy-N-(1 or 3)-n-butyl-2-n-propyl-1′,2′:4,5-naphthoimidazole in 40 parts by volume of pyridine. After agitating this reaction mixture for 2 hours at 40–50° C. it is poured into aqueous hydrochloric acid (1:1). The precipitating naphthoquinone-(1,2)-diazide-(1)-carboxylic acid ester is drawn off, washed and dried. It is a yellow powder which melts at 100° C. with decomposition after previous sintering.

Example 3

A 1% solution of the compound corresponding to Formula 3 in ethylene glycol monomethyl ether is by means of a plate whirler coated onto an aluminum foil one side of which had been mechanically roughened. The coating is then dried. The dried light sensitized foil is then exposed for 5–6 min. under a negative transparent original, using an arc lamp as the light source, and the exposed foil is developed by means of 3% phosphoric acid. Without previously rinsing the foil with water the image may be inked with greasy ink and used as a positive printing plate.

The diazo compound corresponding to Formula 3 is prepared as follows:

9.3 parts by weight of naphthoquinone-(1,2)-diazide-(1)-carboxylic acid chloride-(3) are added to a suspension of 4,5 parts by weight of 7'-hydroxy-N-(1 or 3)-ethyl-2-methyl-1',2':4,5-naphthoimidazole in 50 parts by volume of pyridine. After agitating for 2 hours at 40–50° C., the reaction mixture is poured into hydrochloric acid (1:1). The precipitating naphthoquinone-(1,2)-diazide-1-carboxylic acid ester is drawn off, washed and dried. It forms yellow crystals which melt at 100–103° C. with decomposition.

Example 4

A 1% solution of the compound corresponding to Formula 4 in ethylene glycol monomethyl ether is coated by means of a plate whirler onto an aluminum foil both sides of which had been mechanically roughened, and the coated foil is then dried. The dry light sensitive foil is then exposed for 1–2 minutes under a negative transparent original, using an arc lamp as the light source, and the exposed foil is then developed with 1% phosphoric acid. The image thus developed may then be inked with greasy ink without previously rinsing it with water. A positive printing plate is obtained.

The diazo compound corresponding to Formula 4 is prepared as follows:

3-hydroxy-naphthoic acid-(1) (see Friedländer: "Fortschritte der Teerfarbenfabrikation," volume 15, page 297) is coupled with diazo sulfanilic acid, and from the dyestuff thus obtained 1-amino-2-hydroxy-naphthoic acid-(4) is prepared by reduction with sodium dithionite in an alkaline solution. By diazotizing this amino compound in a dimethyl/hydrochloric acid mixture the naphthoquinone-(1,2)-diazide-(1)-4-carboxylic acid is obtained which is then, by reaction with thionyl chloride in known manner, transformed into the naphthoquinone-(1,2)-diazide-(1)-4-carboxylic acid chloride, which melts at 123° C. with decomposition.

1.4 parts by weight of naphthoquinone-(1,2)-diazide-(1)-4-carboxylic acid chloride are added to a solution of 0.75 part by weight of 7'-hydroxy-N-(1 or 3)-n-propyl-2-ethyl-1',2':4,5-naphthoimidazole in 6 parts by volume of pyridine. After stirring the reaction mixture for 2 hours at room temperature it is poured onto ice. The naphthoquinone-(1,2)-diazide-(1)-carboxylic acid ester which precipitates is then recrystallized from a methanol/water mixture and forms a yellow powder which melts at 160° C. with decomposition.

Example 5

A 1% solution of the compound corresponding to Formula 5 is coated by means of a plate whirler onto an aluminum foil both sides of which had been mechanically roughened. The light sensitized foil is then exposed for about 30 sec. to the light of an arc lamp under a negative transparent original, and the exposed foil is then developed by means of a 1–5% phosphoric acid. Without previously rinsing the developed foil with water the image may now be inked with greasy ink. A positive printing plate is obtained.

Equally good results are obtained when instead of the compound corresponding to Formula 5 the compound corresponding to Formula 6 or the compound corresponding to Formula 7 are used.

The diazo compound corresponding to Formula 5 is prepared as follows:

1.4 parts by weight of naphthoquinone-(1,2)-diazide-(2)-3-carboxylic acid chloride are added to a solution of 0.75 part by weight of 7'-hydroxy-N-(1 or 3)-n-propyl-2-ethyl-1',2':4,5-naphthoimidazole in 6 parts by volume of pyridine. After agitating the reaction mixture for 2 hours at 80° C., it is allowed to cool down and the liquid is drawn off from the precipitating diazo compound. After recrystallization from a dioxane/water mixture the compound corresponding to Formula 5 forms yellow crystals which melt at 190° C. with decomposition.

The diazo compound corresponding to Formula 6 is prepared as follows:

4 parts by weight of naphthoquinone-(1,2)-diazide-(2)-3-carboxylic acid chloride are added to a solution containing 2,8 parts by weight of 7'-hydroxy-N-(1 or 3)-1-n-butyl-2-n-propyl - 1',2':4,5 - naphthoimidazole in 20 parts by volume of pyridine. The mixture is agitated, first for two hours at 40–50° C., then for another two hours at 80° C. The reaction mixture is then poured onto ice and the precipitating naphthoquinone-(1,2)-diazide-(2)-3-carboxylic acid ester is recrystallized from methanol. It is a yellow powder which melts at 180° C. with decomposition.

The diazo compound corresponding to Formula 7 is prepared as follows:

2.8 parts by weight of naphthoquinone-(1,2)-diazide-(2)-3-carboxylic acid chloride are added to a solution containing 2.3 parts by weight of 7'-hydroxy-N-(1 or 3)-ethyl-2-methyl-1',2':4,5-naphthoimidazole dissolved in 40 parts by volume of pyridine. The mixture is agitated, for the first two hours at 40–50° C., then for another two hours at 80° C. Subsequently the reaction mixture is poured into dilute hydrochloric acid, whereupon the yellow naphthoquinone-(1,2)-diazide-(2)-3-carboxylic acid ester precipitates. The precipitate is filtered and then treated with a sodium bicarbonate solution. After recrystallization from a dioxane/water mixture the ester melts at about 135° C. with decomposition.

Example 6

A 0.6% solution of the compound corresponding to Formula 8 in an ethylene glycol monomethyl ether/dimethyl formamide mixture (2:1) is coated by means of a plate whirler onto an aluminum foil both sides of which had been mechanically roughened. The foil thus light sensitized is then exposed for about 30 seconds under a negative transparent original, using an arc lamp as the light source, and the exposed foil is then developed with a 2% phosphoric acid. Without previously rinsing the developed foil with water the image may now be inked with greasy ink. A positive printing plate is obtained.

The diazo compound corresponding to Formula 8 is prepared as follows:

1.4 parts by weight of naphthoquinone-(1,2)-diazide-(2)-4-carboxylic acid chloride are added to a solution of 0.75 part by weight of 7'-hydroxy-N-(1 or 3)-n-propyl-2-ethyl-1',2':4,5-naphthoimidazole in 6 parts by volume of pyridine. After agitating the reaction mixture for 1 hour at 45° C. it is poured into aqueous hydrochloric acid (1:1). The precipitating naphthoquinone-(1,2)-diazide-(2)-5-carboxylic acid ester is dissolved in dioxane and then reprecipitated by adding water. The ester forms a yellow powder which melts at 145° C. with decomposition.

Example 7

A 1% solution of the compound corresponding to Formula 3 is coated by means of a plate whirler onto a mechanically roughened aluminum foil and dried. The dried light sensitized layer is exposed for 5–6 minutes under a positive transparent original, the light source being an arc lamp, and the exposed foil is then developed by means of a 5% trisodium phosphate solution containing 15% of ethylene glycol momethyl ether. Without a further acid treatment the image may be inked with greasy ink and used as a (positive) printing plate. For the preparation of the compound corresponding to Formula 3 see Example 3.

*Example 8*

Special paper stock for making planographic paper printing plates manufactured in accordance with the method described in Patent No. 2,534,588 and sold by S. D. Warren Company of Cumberland Mills, Maine, is whirl-coated with a 1.5% ethylene glycol monomethyl ether solution of the compound corresponding to Formula 4. The coated paper is dried by means of a current of hot air. The dry paper which is now light sensitive is exposed for 1–2 minutes under a negative transparent original. The exposed layer is subsequently developed with a 1% aqueous phosphoric acid solution to yield a positive image, i.e. whereas the original was a negative, the image developed by using phosphoric acid is a positive. It is unnecessary to rinse the developed layer with water. The imaged paper sheet can at once be inked up with greasy ink and used as a planographic printing plate affording high runs of positive copies.

Details in relation to the manufacture of the compound corresponding to Formula 4 have been stated in Example 4.

This application is a continuation-in-part of application Serial No. 524,622, filed July 26, 1955, and now abandoned.

What is claimed is:

1. A compound having the formula

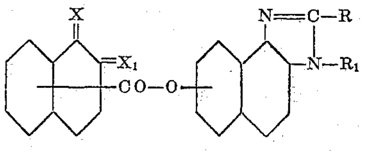

in which X and $X_1$ are selected from the group consisting of $N_2$ and O and are different, and R and $R_1$ are alkyl radicals.

2. A compound having the formula

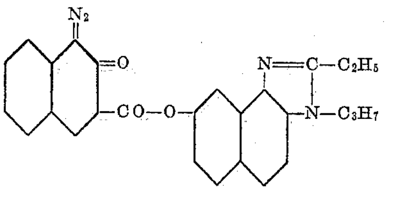

3. A compound having the formula

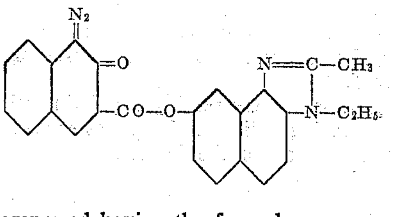

4. A compound having the formula

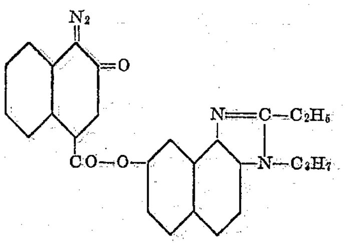

5. A compound having the formula

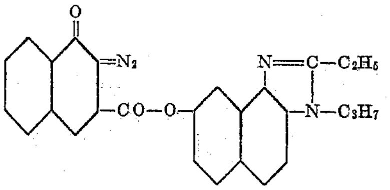

6. A compound having the formula

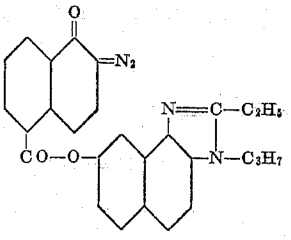

7. A presensitized printing plate comprising a base material having a coating thereon comprising a compound having the formula

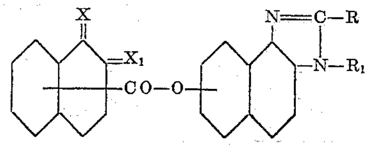

in which X and $X_1$ are selected from the group consisting of $N_2$ and O and are different, and R and $R_1$ are alkyl radicals.

8. A presensitized printing plate comprising a base material having a coating thereon comprising a compound having the formula

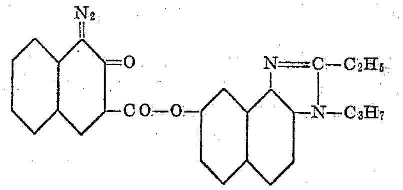

9. A presensitized printing plate comprising a base material having a coating thereon comprising a compound having the formula

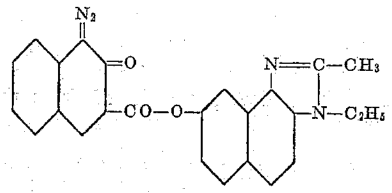

10. A presensitized printing plate comprising a base material having a coating thereon comprising a compound having the formula

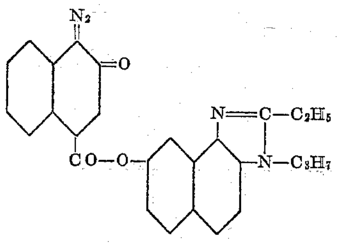

11. A presensitized printing plate comprising a base material having a coating thereon comprising a compound having the formula

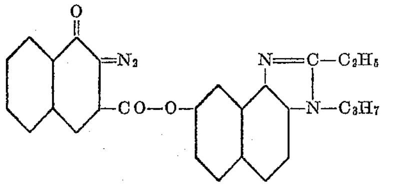

12. A presensitized printing plate comprising a base material having a coating thereon comprising a compound having the formula

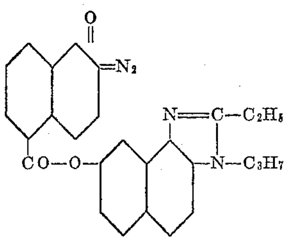

13. A process for developing a printing plate which comprises exposing to light under a master a plate having a compound thereon of the formula

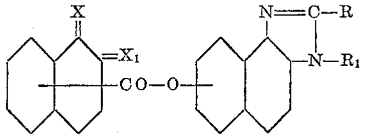

in which X and $X_1$ are selected from the group consisting of $N_2$ and O and are different, and R and $R_1$ are alkyl radicals; to thereby form a decomposition product in the light struck areas and removing the undecomposed compound by treatment with a developer selected from the group consisting of acids, acid salts, organic solvents, and mixtures thereof.

14. A process for developing a printing plate which comprises exposing to light under a master a plate having a compound thereon of the formula

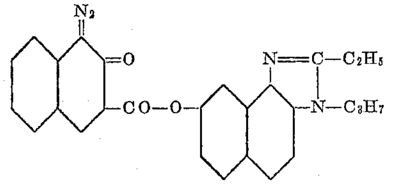

to thereby form a decomposition product in the light struck areas and removing the undecomposed compound by treatment with a developer selected from the group consisting of acids, acid salts, organic solvents, and mixtures thereof.

15. A process for developing a printing plate which comprises exposing to light under a master a plate having a compound thereon of the formula

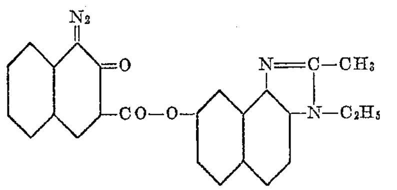

to thereby form a decomposition product in the light struck areas and removing the undecomposed compound by treatment with a developer selected from the group consisting of acids, acid salts, organic solvents, and mixtures thereof.

16. A process for developing a printing plate which comprises exposing to light under a master a plate having a compound thereon of the formula

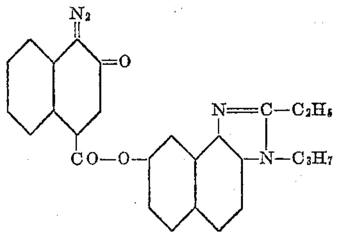

to thereby form a decomposition product in the light struck areas and removing the undecomposed compound by treatment with a developer selected from the group consisting of acids, acid salts, organic solvents, and mixtures thereof.

17. A process for developing a printing plate which comrises exposing to light under a master a plate having a compound thereon of the formula

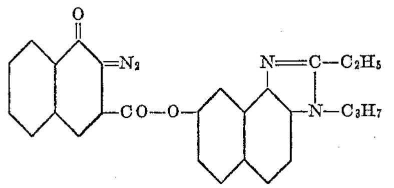

to thereby form a decomposition product in the light struck areas and removing the undecomposed compound by treatment with a developer selected from the group consisting of acids, acid salts, organic solvents, and mixtures thereof.

18. A process for developing a printing plate which comprises exposing to light under a master a plate having a compound thereon of the formula

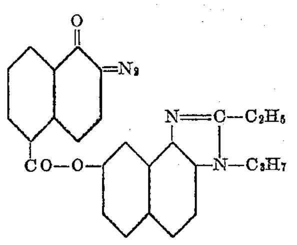

to thereby form a decomposition product in the light struck areas and removing the undecomposed compound by treatment with a developer selected from the group consisting of acids, acid salts, organic solvents, and mixtures thereof.

19. A process for developing a printing plate which comprises exposing to light under a master a plate having a compound thereon of the formula

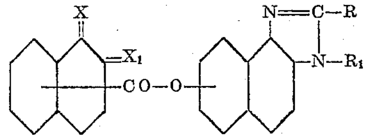

in which X and $X_1$ are selected from the group consisting of $N_2$ and O and are different, and R and $R_1$ are alkyl radicals; to thereby form a decomposition product in the light struck areas and removing the decomposition product by treatment with a weakly alkaline solution.

20. A process for developing a printing plate which comprises exposing to light under a master a plate having a compound thereon of the formula

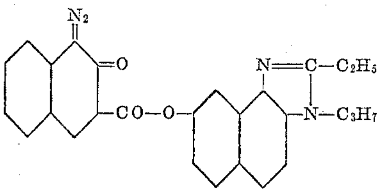

to thereby form a decomposition product in the light struck areas and removing the decomposition product by treatment with a weakly alkaline solution.

21. A process for developing a printing plate which comprises exposing to light under a master a plate having a compound thereon of the formula

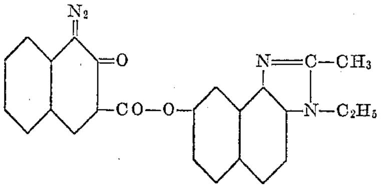

to thereby form a decomposition product in the light struck areas and removing the decomposition product by treatment with a weakly alkaline solution.

22. A process for developing a printing plate which comprises exposing to light under a master a plate having a compound thereon of the formula

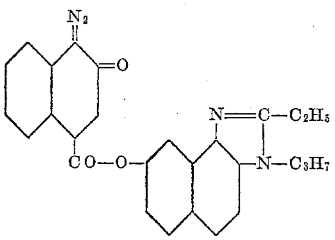

to thereby form a decomposition product in the light struck areas and removing the decomposition product by treatment with a weakly alkaline solution.

23. A process for developing a printing plate which comprises exposing to light under a master a plate having a compound thereon of the formula

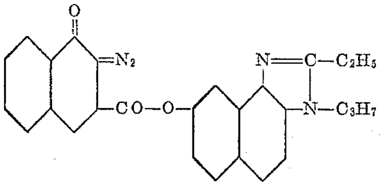

to thereby form a decomposition product in the light struck areas and removing the decomposition product bv treatment with a weakly alkaline solution.

24. A process for developing a printing plate which comprises exposing to light under a master a plate having a compound thereon of the formula

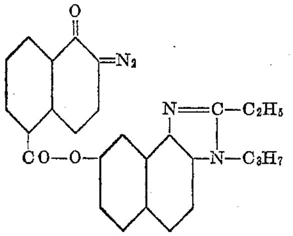

to thereby form a decomposition product in the light struck areas and removing the decomposition product by treatment with a weakly alkaline solution.

25. A compound having the formula:

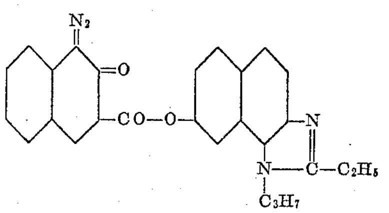

26. A compound having the formula:

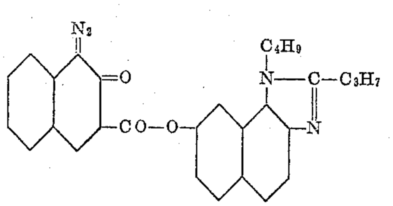

27. A compound having the formula:

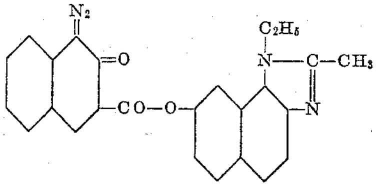

28. A compound having the formula:

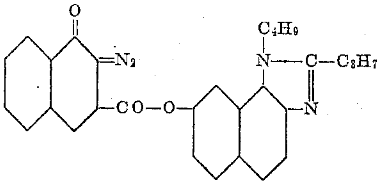

29. A compound having the formula:

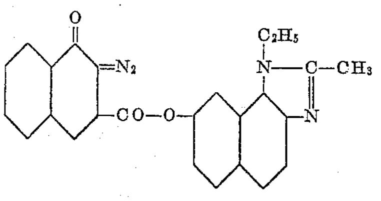

30. A compound having the formula:

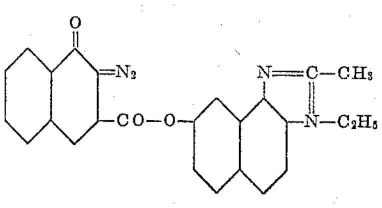

References Cited in the file of this patent

FOREIGN PATENTS

| | | |
|---|---|---|
| k25,044 | Germany (Kl. 12810) | July 26, 1956 |
| 497,135 | Belgium | Aug. 14, 1950 |
| 928,621 | Germany | June 6, 1955 |
| 1,069,408 | France | Feb. 10, 1954 |